3,414,614
ACETAMIDINE DERIVATIVES
Marc Julia, Paris, France, assignor to Rhone-Poulenc S.A., Paris, France, a French body corporate
No Drawing. Filed July 23, 1965, Ser. No. 474,456
Claims priority, application France, July 31, 1964, 983,870
9 Claims. (Cl. 260—558)

ABSTRACT OF THE DISCLOSURE

The invention provides new 2-benzamidoacetamidines which have useful pharmacological properties, e.g. as antidepressants.

This invention relates to new acetamidine derivatives, to a process for their preparation, and to pharmaceutical compositions containing them.

According to the present invention there are provided the new acetamidine derivatives of the general formula:

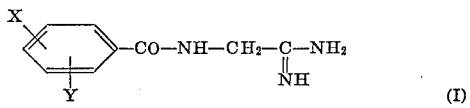

wherein X represents a nitro or amino group, and Y represents a hydrogen atom or an alkyl group containing up to six carbon atoms, preferably methyl or ethyl, and their acid addition salts.

The compounds of general Formula I possess useful pharmacological properties. Preferred compounds are those in which X is in the 4- or 5-position of the benzene ring and Y, when an alkyl group, is in the 2- or 3-position. The acetamidine derivatives in which X represents an amino group and also their acid addition salts show an especially marked antidepressive action; a compound particularly outstanding in this respect is p-aminobenzamidoacetamidine. The compounds of Formula I can also be used as intermediates in organic syntheses.

The acetamidines of Formula I can be prepared by the application of classical methods. According to a feature of the present invention, they are prepared by converting the nitrile group of a nitrobenzamidoacetonitrile of the general formula:

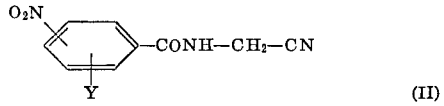

wherein Y is as hereinbefore defined, into an amidino group by methods known per se for effecting such a conversion, and optionally reducing the nitro substituent in the resultant nitrobenzamidoacetamidine into a primary amino group by methods known per se and which do not affect other functions of the molecule. Conversion of a nitrobenzamidoacetonitrile into the corresponding acetamidine compound is preferably effected by reaction of an alcohol ROH (wherein R represents an alkyl group containing up to 6 carbon atoms), for example ethanol, on a solution of the acetonitrile in an inert organic solvent, such as chloroform, and saturating the solution with gaseous hydrogen chloride, all the reactants being anhydrous. The resultant iminoether hydrochloride of the formula:

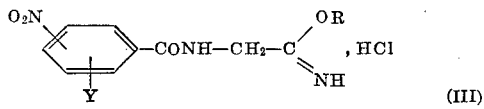

is isolated and suspended in an anhydrous alkanol ROH and the suspension saturated with gaseous ammonia with cooling to a temperature below 20° C. After leaving the reaction mixture to stand, the hydrochloride of the nitrobenzamidoacetamidine formed is isolated in manner known per se. This hydrochloride can then be transformed into the hydrochloride of the corresponding aminobenzamidoacetamidine by reduction of the nitro group to a primary amino group. The reduction is preferably effected with hydrogen at atmospheric pressure and at ambient temperature, i.e. 20–25° C., in methanolic medium in the presence of Raney nickel.

From the hydrochlorides of the acetamidine compounds obtained by the procedure just described, the acetamidine bases can be obtained in manner known per se and the bases converted into different acid addition salts by methods known per se. Thus, the addition salts may be prepared by the action of acids on an acetamidine base of Formula I in an appropriate solvent, for example an alcohol such as ethanol or methanol. The salt formed is precipitated, if necessary after concentration of its solution, and is separated by filtration or decantation.

By the term "methods known per se" as used in this specification and accompanying claims is meant methods heretofore used or described in the literature.

The nitrobenzamidoacetonitriles of Formula II employed as starting material can be prepared by the action of aminoacetonitrile on a halide, preferably chloride, of a nitrobenzoic acid of the formula:

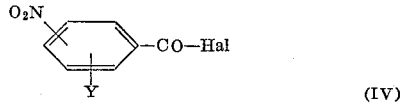

wherein Hal represents a halogen atom and Y is as hereinbefore defined. The reaction is preferably carried out using an acid addition salt of the aminoacetonitrile, in particular the sulphate, in an aqueous medium in the presence of an alkali at a temperature below ambient temperature. The nitrobenzoyl halide is advantageously added in solution in a hydrocarbon solvent.

For therapeutic purposes, the acetamidine derivatives of general Formula I are employed as such or in the form of non-toxic acid addition salts, i.e. salts containing anions which are relatively innocuous to the animal organism in therapeutic doses of the salts (such as hydrochlorides, phosphates, nitrates, sulphates, acetates, propionates, succinates, benzoates, fumarates, maleates, methylene-bis-β-hydroxynaphthoates, salicylates, gentisates, methanesulphonates and isethionates) so that the beneficial physiological properties inherent in the bases are not vitiated by side-effects ascribable to the anions.

The following examples illustrate the preparation of acetamidine derivatives of the invention.

EXAMPLE I p-Nitrobenzamidoacetonitrile (6.4 g.) is dissolved in chloroform (70 cc.) and absolute ethanol (10 cc.) and the solution saturated at 0° C. with dry gaseous hydrogen chloride. Complete dissolution occurs for five minutes and then the mixture solidifies to a saturated mass. The reaction vessel is closed up and left to stand for 5 hours at ambient temperature. Thereafter diethyl ether (100 cc.) is added and the solid phase filtered off, washed with diethyl ether and dried. The solid obtained is suspended in anhydrous ethanol (80 cc.), and the suspension saturated at 0° C. with dry gaseous ammonia and left overnight at ambient temperature (20° C.). After cooling, the solid product is filtered off and washed with diethyl ether. Recrystallisation of the solid from a 0.1 N hydrochloric acid solution gives the hydrochloride of p-nitrobenzamidoacetamidine (7.2 g.; yield 90%) in the form of nearly white crystals melting at 245–250° C.

The p-nitrobenzamidoacetonitrile employed as starting material is obtained in the following way:

Aminoacetonitrile sulphate (7 g.) is added at 0° C. to a solution of sodium hydroxide (6 g.) in water (40 cc.). To the solution at 0° C., p-nitrobenzoyl chloride (8.5 g.) in benzene (40 cc.) is added and the mixture agitated vigorously. After filtration, the solid residue is washed with water, N hydrochloric acid and once again with water. The solid obtained is dissolved in 80% ethanol, decolorized with charcoal, filtered and made to crystallize. There is thus obtained p-nitrobenzamidoacetonitrile (6.4 g.; yield 64%) melting at 135–136° C.

EXAMPLE II p-Nitrobenzamidoacetamidine hydrochloride (10 g.), prepared as described in Example I, is dissolved in 80% methanol (200 cc.) and then Raney nickel (2 g.) is added. Into the solution at ambient temperature (20° C.) a current of hydrogen at atmospheric pressure is passed until absorption of hydrogen ceases; absorption of hydrogen is 2.9 litres (theoretical 3 litres). The solution is filtered to isolate the nickel, concentrated to dryness in vacuo and the product obtained recrystallised from 90% methanol. There is thus obtained p-aminobenzamidoacetamidine monohydrochloride (7.8 g.; yield 89%) in the form of white crystals melting at 226–228° C.

EXAMPLE III m-Nitrobenzamidoacetonitrile (50 g.) is dissolved in chloroform (300 cc.) and absolute ethanol (50 cc.) and then the solution is saturated at 0° C. with dry gaseous hydrogen chloride. The reaction mixture is left to stand at ambient temperature for 5 hours, after which diethyl ether (1,500 cc.) is added. The precipitate obtained is filtered off and washed with diethyl ether (1,000 cc.). After drying, it is suspended in absolute ethanol (600 cc.) and the suspension saturated by passing therethrough a current of dry gaseous ammonia. The reaction mixture is left to stand overnight, cooled, filtered and washed with diethyl ether. There is thus obtained m-nitrobenzamidoacetamidine hydrochloride (49 g.; yield 79%) in the form of nearly white crystals melting at 210–212° C.

The m-nitrobenzamidoacetonitrile employed as starting material is obtained in the following way:

Aminoacetonitrile sulphate (102 g.) is added to a solution of sodium hydroxide (80 g.) in water (400 cc.). To the solution at 0° C. there is added a solution of m-nitrobenzoyl chloride (130 g.) in benzene (350 cc.) and the reaction mixture stirred vigorously. The solid product formed is filtered off, washed with water, 2 N hydrochloric acid and finally with water, and recrystallised from ethanol. There is thus obtained m-nitrobenzamidoacetonitrile (112 g.; yield 74%) melting at 110° C.

EXAMPLE IV m-Nitrobenzamidoacetamidine hydrochloride (40 g.) is dissolved in methanol (600 cc.). To this solution there is added Raney nickel (4 g.) and a current of hydrogen at atmospheric pressure is passed through the solution at ambient temperature (20° C.). There is absorbed 9.6 litres of hydrogen (theoretical 10 litres). The nickel is removed by filtration, and the filtrate concentrated in vacuo. m-Aminobenzamidoacetamidine monohydrochloride is obtained in the form of an oil which rapidly turns brown in the air.

By treatment of the oil with ethanol saturated with gaseous hydrogen chloride the dihydrochloride of the acetamidine is precipitated. It is filtered off and recrystallised from methanol to give m-aminobenzamidoacetamidine dihydrochloride (24 g.; yield 56%) in the form of white crystals melting at 242–245° C.

EXAMPLE V

Anhydrous ethanol (2.64 cc.) is added to 2-methyl-5-nitrobenzamidoacetonitrile (10 g.) in chloroform (100 cc.). The mixture is cooled energetically and the nitronitrile suspension saturated with dry gaseous hydrogen chloride. There is no dissolution, but the suspension sets to a compact mass. This is left overnight at ambient temperature, filtered after dilution with a little anhydrous diethyl ether, and dried in vacuo. There is thus obtained the non-hygroscopic iminoether hydrochloride (12.3 g.; yield 88%) melting at 137° C.

The iminoether hydrochloride is then suspended in anhydrous ethanol (200 cc.), cooled energetically and saturated with dry gaseous ammonia; dissolution of the precipitate is almost instantaneous. When saturation is achieved, the reaction mixture is placed in a refrigerator and left overnight, filtered to separate an impurity, and the ethanolic solution concentrated on a water bath in vacuo. The precipitate formed is filtered off and recrystallised from ethanol to give 2-methyl-5-nitrobenzamidoacetamidine hydrochloride (7.4 g.; yield 66%) melting at 220° C.

The 2-methyl-5-nitrobenzamidoacetonitrile employed as starting material is prepared by a similar procedure to that described in Example I. Starting with aminoacetonitrile sulphate (7.7 g.) and 2-methyl-5-nitrobenzoyl chloride (10 g.), there is obtained 2-methyl-5-nitrobenzamidoacetonitrile (8.5 g.; yield 78%) melting at 171° C.

EXAMPLE VI

By proceeding as described in Example II but starting with 2-methyl-5-nitrobenzamidoacetamidine hydrochloride (5 g.), there is obtained 2-methyl-5-aminobenzamidoacetamidine hydrochloride (4.5 g.) melting at 194° C.

EXAMPLE VII

By proceeding as described in Example V but starting with 3 - methyl - 4 - nitrobenzamidoacetonitrile (M.P. 136° C.), there is obtained 3-methyl-4-nitrobenzamidoacetamidine hydrochloride melting at 248–250° C.

The 3-methyl-4-nitrobenzamidoacetonitrile employed as starting material can be prepared by the procedure described in Example I but starting with 3-methyl-4-nitrobenzoyl chloride.

EXAMPLE VIII

By hydrogenation employing the procedure described in Example II the 3-methyl-4-nitrobenzamidoacetamidine hydrochloride obtained as described in Example VII is transformed into 3-methyl-4-aminobenzamidoacetamidine hydrochloride melting at 222° C.

The present invention includes within its scope pharmaceutical compositions which comprise at least one of the acetamidine derivatives of general Formula I, or non-toxic acid addition salt thereof, in association with a pharmaceutically-acceptable carrier or coating. In clinical practice the compounds of the present invention will normally be administered orally, parenterally or rectally.

Solid compositions for oral administration include tablets, pills, powders, and granules. In such solid compositions one or more of the active compounds is, or are, admixed with at least one inert diluent such as starch, sucrose or lactose. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing the active compound and inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Preparations according to the invention for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter, solidified glycerine, or a suitable wax base.

The percentage of active ingredient in the compositions of the invention may be varied, it being necessary that it should constitute a proportion such that a suitable dosage shall be obtained. The dosage will depend upon the therapeutic effect sought, the route of administration and the duration of treatment. In human therapy the compositions should generally be administered so as to give to an adult, in the case of oral administration, 0.03 to 0.5 g. of active substance per day.

The following examples illustrate pharmaceutical compositions according to the invention.

EXAMPLE IX

Using conventional techniques, tablets are prepared having the following composition:

|  | Mg. |
|---|---|
| p-Aminobenzamidoacetamidine hydrochloride | 11.9 |
| Starch | 103.1 |
| Colloidal silica | 32 |
| Magnesium stearate | 3 |

EXAMPLE X

Using conventional techniques, tablets are prepared having the following composition:

|  | Mg. |
|---|---|
| p-Aminobenzamidoacetamidine hydrochloride | 59.5 |
| Starch | 140.5 |
| Colloidal silica | 46 |
| Magnesium stearate | 4 |

I claim:

1. An acetamidine derivative selected from the group consisting of the compound of the formula:

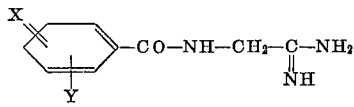

wherein X represents nitro or amino in the 4- or 5-position of the benzene ring, and Y represents hydrogen or alkyl of one to two carbon atoms in the 2- or 3-position, and a non-toxic acid addition salt thereof.

2. An acetamidine derivative selected from the group consisting of 2-(p-aminobenzamido)acetamidine and a non-toxic acid addition salt thereof.

3. An acetamidine derivative selected from the group consisting of 2-(p-nitrobenzamido)acetamidine and a non-toxic acid addition salt thereof.

4. An acetamidine derivative selected from the group consisting of 2-(m-aminobenzamido)acetamidine and a non-toxic acid addition salt thereof.

5. An acetamidine derivative selected from the group consisting of 2-(m-nitrobenzamido)acetamidine and a non-toxic acid addition salt thereof.

6. An acetamidine derivative selected from the group consisting of 2-(2-methyl-5-aminobenzamido)acetamidine and a non-toxic acid addition salt thereof.

7. An acetamidine derivative selected from the group consisting of 2-(2-methyl-5-nitrobenzamido)acetamidine and a non-toxic acid addition salt thereof.

8. An acetamidine derivative selected from the group consisting of 2-(3-methyl-4-aminobenzamido)acetamidine and a non-toxic acid addition salt thereof.

9. An acetamidine derivative selected from the group consisting of 2-(3-methyl-4-nitrobenzamido)acetamidine and a non-toxic acid addition salt thereof.

References Cited

Freudenberg et al., Berichte, vol. 65, pp. 1183–85 (1932), QD1D4.

HENRY R. JILES, *Primary Examiner.*

H. I. MOATZ, *Assistant Examiner.*